United States Patent [19]

Rando

[11] Patent Number: 5,214,270
[45] Date of Patent: May 25, 1993

[54] MODULAR HANDHELD OR FIXED SCANNER

[75] Inventor: Joseph F. Rando, Los Altos Hills, Calif.

[73] Assignee: Spectra-Physics, San Jose, Calif.

[21] Appl. No.: 796,717

[22] Filed: Nov. 22, 1991

[51] Int. Cl.⁵ .............................................. G06K 7/10
[52] U.S. Cl. .................................. 235/472; 235/462
[58] Field of Search ................................ 235/462, 472

[56] References Cited

U.S. PATENT DOCUMENTS

| | | | |
|---|---|---|---|
| 4,394,645 | 7/1983 | Humble et al. | 340/572 |
| 4,676,343 | 6/1987 | Humble et al. | 235/383 |
| 4,760,248 | 7/1988 | Swartz et al. | 235/472 |
| 4,766,296 | 8/1988 | Barth | 235/383 |
| 4,766,297 | 8/1988 | McMillan | 235/462 |
| 4,792,018 | 12/1988 | Humble et al. | 235/383 |
| 4,825,045 | 4/1989 | Humble | 235/383 |
| 4,825,057 | 4/1989 | Swartz et al. | 235/472 |
| 4,833,308 | 5/1989 | Humble | 235/375 |
| 4,929,819 | 5/1990 | Collins, Jr. | 235/383 |
| 4,939,355 | 7/1990 | Rando et al. | 235/467 |
| 4,940,116 | 7/1990 | O'Conner et al. | 235/383 |
| 4,959,530 | 9/1990 | O'Conner | 235/383 |
| 4,964,053 | 10/1990 | Humble | 235/383 |
| 5,132,523 | 7/1992 | Bassett | 235/462 |

Primary Examiner—Constantine Hannaher
Assistant Examiner—Don Wong
Attorney, Agent, or Firm—Lyon & Lyon

[57] ABSTRACT

A bar code scanning system which can be operated in two scanning categories: hendheld and fixed. The system incorporates a second scanning element having a fixedly mounted mirror and a dithering mirror disposed in relation to a hand-held scanner which is removably positioned in a holder means.

24 Claims, 2 Drawing Sheets

MODULAR HANDHELD OR FIXED SCANNER

BACKGROUND OF THE INVENTION

1. Field Of The Invention

The field of the present invention relates generally to bar code scanning devices. More particularly, the field of the present invention relates to a modular, handheld or fixed scanner for reading an optical bar code by means of a scanning laser beam.

2. The Prior Art

Conventional point of sale (POS) bar code label readers in use today are of two general categories, fixed and handheld. Fixed scanners are typically mounted in a counter top and are typically used in supermarkets where there is a well established flow of goods along a predetermined item path from one location to another. An example of such a conventional fixed scanner is described in U.S. Pat. No. 4,939,355 and in references cited therein. The scan lines produced by such a scanner are directed generally to the package along its path. In addition, the scan lines are directed at many angles to facilitate reading the bar code label at any orientation. This category has the advantage of freeing the checker's hands to move the item past the scanner.

In the second category, the scanner is held in the hand of the checker or sales person. In this case, there may be no fixed flow of goods, but rather the labeled items may be located in different directions from the checker or sales person. For example, in many POS locations, a large counter is used and the goods may come from either end of the counter. In such applications, a handheld scanner is most useful because the scanner can be directed to the label wherever it appears. Such scanners are described in U.S. Pat. Nos. 4,760,248 and 4,825,057, for example. This type of scanner generally produces a single line scan pattern which is repeated several times a second. This scan line is generally horizontal but can be rotated and pointed by the operator to scan across all the bars of the bar code label.

In some POS applications, a fixed scanner is required because the flow of goods along an item path is well defined. At other times, a handheld scanner is required because the labeled items may be coming from different directions. There is therefore a need for a scanner which can perform the functions of a fixed scanner and also the functions of a handheld scanner. Such a scanner which could be rapidly and conveniently converted from functioning as a fixed scanner to functioning as a handheld scanner would be very useful in POS applications which have widely different needs and differing item paths.

It would also be extremely advantageous from a cost and efficiency perspective, if a single bar code scanner could be designed as a modular component of a scanning system. Such a scanning device, in a first module, would be employed for unrestricted, multidirectional handheld scanning of various items. The scanner could then be changed to a second configuration for accurate scanning from a fixed location with respect to a well defined item path. Ideally, the scanner should be freely and quickly interchangeable between modules without any down time for modification and without any adverse impact o scanning performance.

SUMMARY OF THE INVENTION

In order to achieve the foregoing and other objectives, a modular bar code scanning system is described. According to one aspect of the invention, the present scanner can be used for both scanning categories, that is for all fixed scanning of items along a well defined item path, as well as for handheld applications.

In a first module, the present device comprises a handheld scanner which functions in a normal fashion. It is held by a sales person to freely scan items at a point of sale which are not confined to an item path. Such a scanner produces a focused beam typically forming a scan line which is optimum for its us as a handheld scanner. This device also includes a means for scanning the beam and means for collecting reflected light from a bar code label including means for decoding bar code information.

In accordance with an aspect of this invention, when the handheld scanner is inserted into a second module, a fixed scanner is created. The second module includes a mechanical mounting arrangement which allows the handheld scanner to be easily and conveniently inserted to form a fixed scanner for accurately resolving the bar code labels of items moving on an item path. The second module may also include optics for reforming the scanning beam for optimally resolving, from a fixed position, a bar code label of items in the item path. Pattern mirrors and a motor driven mirror scan the laser beam in different directions to form a substantially omnidirectional pattern. Insertion of the handheld scanner into the second module can also activate a scanning means such as a motor a driven polygonal mirror or a piezoelectrically driven tilted mirror or a solenoid activated mirror for scanning from a fixed location, and, or deactivate the scanning motor within the handheld scanner. A low power telescope in the second module can make the beam smaller or larger as needed to produce a beam waist at a desired location. Similarly, a single negative or positive lens or mirror can be used to reposition the spot to an optimum location for resolving a bar code label. The reflected light from the label can be collected by optics within the second module and the information contained therein can then be decoded in accordance with well known techniques. Alternatively, the collection means and decoding means of the handheld scanner can. also be employed in the second module An object of the present invention is to reduce the cost and size of POS stations which require both a handheld scanning capability and a fixed scanning capability. In the preferred embodiment, the incremental cost of providing a fixed scanner includes the cost of the housing, connection hardware, mirrors and the mirror or scanning element. This represents a significant savings over the cost of a separate fixed scanner and a handheld scanner. The counter area of a POS location is used to display items for sale and is therefore considered very costly in terms of space. The reduced size of the combined fixed and handheld scanner of the present invention therefore makes valuable space available for sale purposes. Another advantage of the smaller size of the combined fixed and handheld scanner of the present invention is an increase of spatial freedom which improves the ergonomics of the POS station.

The performance of the scanner according to the present invention in the fixed application can be enhanced by careful design of the individual components. For example, the spot size at the scan plane may be obtained by using a weak telescope to magnify the entire scan beam. The light from the label is scattered in a specular and diffuse reflection will be collected more efficiently through the telescope. Preferably, the pattern mirrors are coated for high reflectivity to avoid loss of optical power. The scanning of the beam can be done by combining the scanning of the handheld scanner with additional scanning by a mirror downstream of the handheld scanner. Alternatively, all the scanning can be accomplished by a rotating polygonal mirror. In the latter case, the scanning mechanism in the handheld scanner is deactivated when polygon scanning is activated.

DETAILED DESCRIPTION

Figure 1:
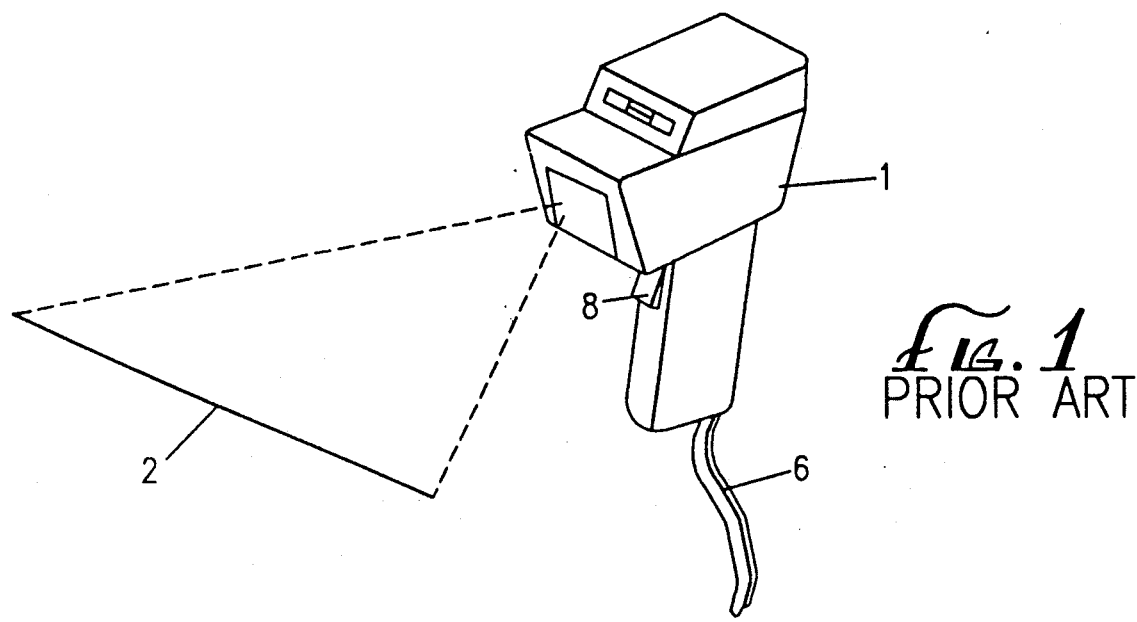
FIG. 1 is a perspective view of a generic handheld scanner showing a typical scan line.

Referring now to FIG. 1, a generic handheld scanner 1 has a built-in scanning and light collection subsystem. The handheld scanner 1 includes a source of laser light and produces a focused beam which scans a locus of points forming scan line 2 for resolving a bar code label. Detected light returning from a bar code label being scanned is collected by optical collection means within the scanner and is electronically processed by circuits within the handheld scanner unit 1 in accordance with well known techniques. The processed signal containing the item information decoded by the processing circuitry is sent via a cable 6 to the next instrument for further processing or data handling. A switch 8 selectively activates the handheld scanner when it is in the hand of the user The handheld scanner 1 is used for scanning oversize items or items which are not confined to an item path, and comprises a first module of the present modular scanning system.

Figure 2:
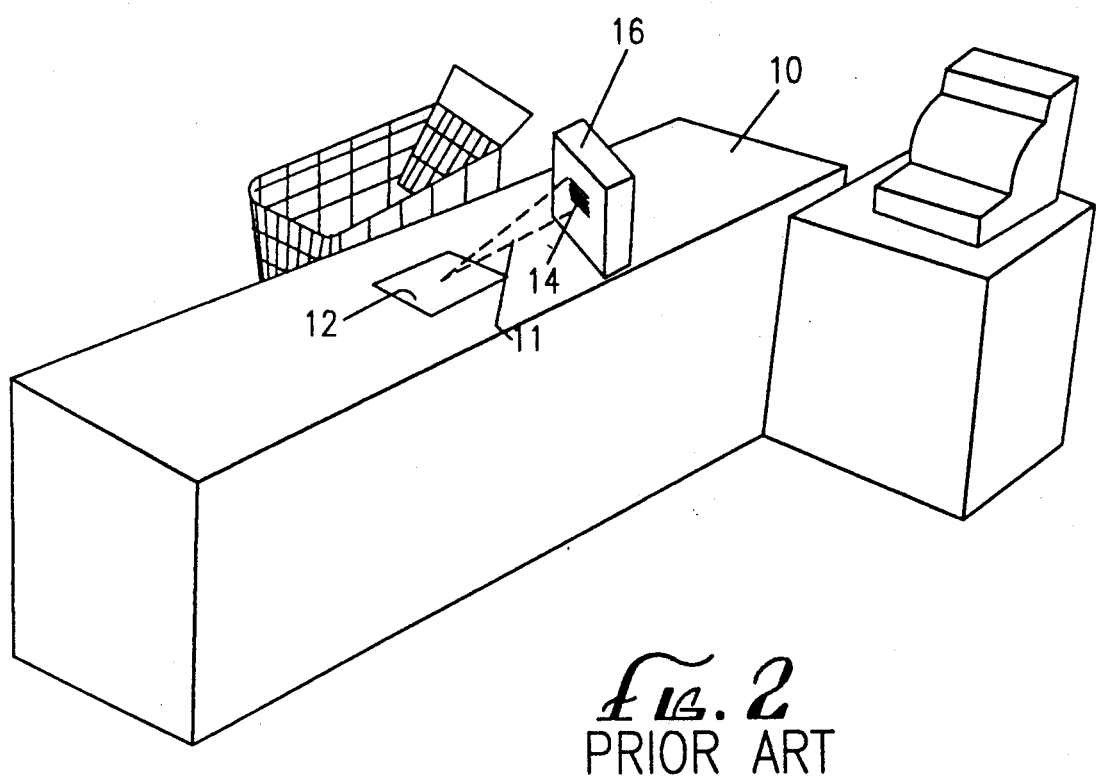
FIG. 2 is a perspective view of a generic fixed scanner installation showing a typical scan pattern.

Referring now to FIG. 2, a conventional POS station is shown with a scanner built into the counter top 10. The scanning beam 11 passes through the window 12 making a scan pattern 14 on a package 16 being scanned. The flow of goods is generally from right to left in FIG. 2.

Figure 3:
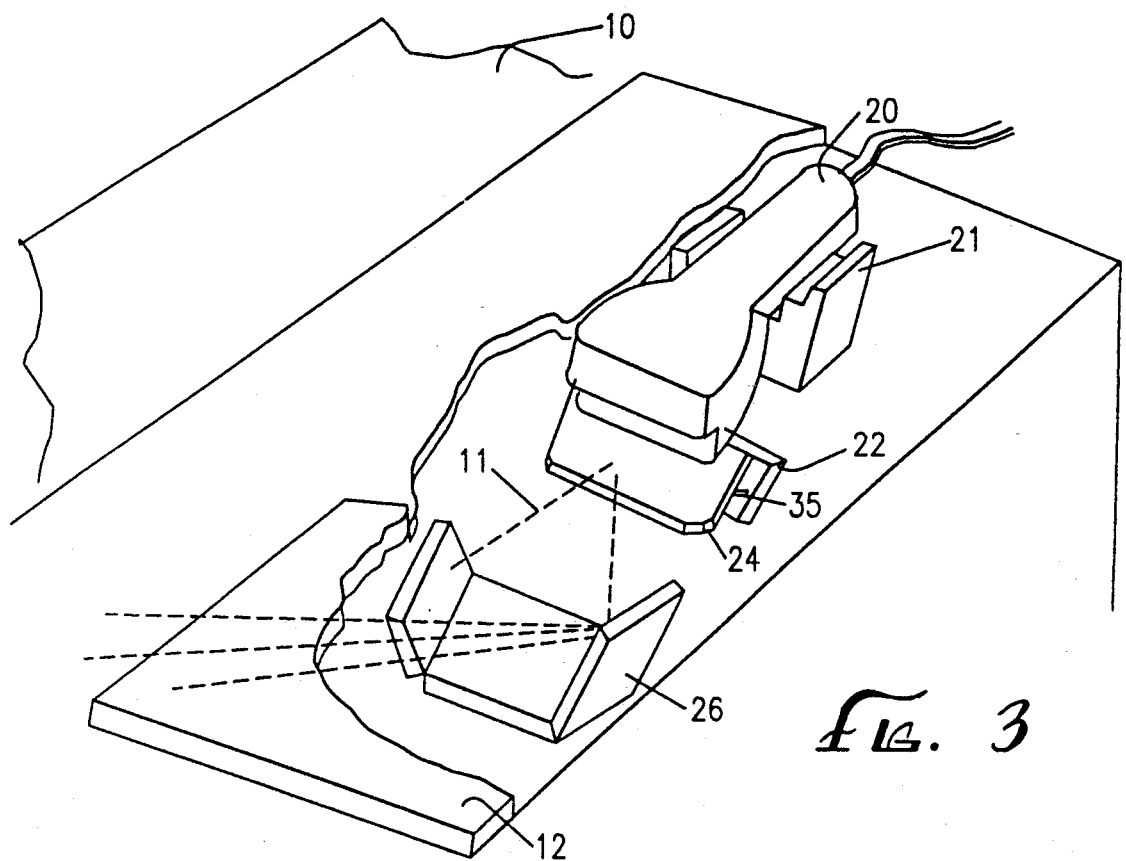
FIG. 3 is a perspective cut-away view showing how the handheld scanner is insertable into the fixed scanner module for redirecting the scan beams in accordance with the present invention.

Referring now to FIG. 3, a preferred embodiment of the present invention comprises a modular scanning system wherein a handheld scanner 20 is mounted in a holder means 21. The holder means 21 includes means for positively capturing the handheld scanner unit 20 and for establishing a mechanical relationship between the handheld scanner unit 20 and holder means 21 The fastening of the handheld scanner 20 into the holder means 21 also can automatically activate a switch (such as switch 8 as shown in FIG. 1) which turns on the handheld scanning unit 20 and activates the scanning laser beam 11 as shown. In this configuration, the handheld scanner functions in a second module as a fixed scanner producing a beam which is scanned in an omnidirectional pattern to provide an optimal scanning region for resolving bar code labels of items on a defined item path.

According to one aspect of the present modular scanning system, in the second or fixed mode, separate scanning means are provided for scanning the beam from the handheld scanner in a locus of positions which define an ideal scanning plane for resolving the bar code labels of items moving along a predetermined item path.

A mirror 24 is mounted on a cantilever beam 34 which is fastened through base member 22 to a wall or housing beneath counter top 10. The counter top 10 preferably defines an item path. The mirror 24 reflects the laser beam 11 and scans the line pattern produced by the handheld scanner 20 to sweep a volume in space. This is the scan volume in which the label will be read. When the handheld unit 20 is inserted in its holding means 21, the scanning beams 11 are directed to a set of fixed pattern mirrors 26 located in the same housing beneath window 12. The pattern mirrors 26 convert a single broad scan line into three or more lines, two of which can be nearly vertical. Advantageously, this scan pattern enables the scanning unit 20 in accordance with the present invention to read bar code labels of items moving on an item path, from a fixed position without the need for orientation of the items.

Figure 4:
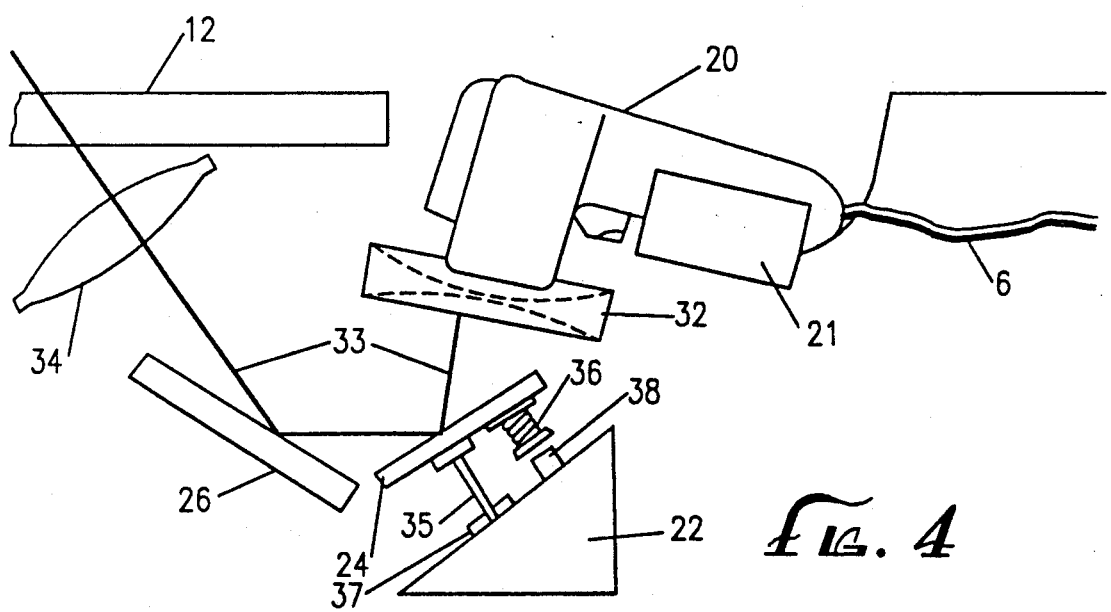
FIG. 4 is a side view of the handheld scanner in its mount with optics for re-imaging the beam and scanning means in accordance with the present invention.

FIG. 4 shows the scanning and optics of a preferred embodiment of a modular handheld scanner employed in a second module, that is, as a fixed scanner in accordance with the present invention. A large negative lens 32 is disposed for focusing the laser beam 33 projected from the scanner unit 20. The large negative lens 32 combines with a positive lens 34 to allow the imaging of the spot to the desired location above the window 12 The mirror 26 directs the scanning beam 33 through the positive lens 34 and through window 12 to form an appropriate scan line. Preferably, the embodiment is able to produce at least one scan line at substantially right angles to other scan lines. The scan lines thus project upwardly through the mirror 12 to scan a locus of lines which define an idealized scanning region for resolving a bar code label. The mirror 26 provides a beam directing means for directing the beam 33 through the positive lens 34. The positive lens 34 provides a means for forming a beam waist at a desired location wherein the beam 33 is sufficiently focused to resolve the bar code lines.

Those skilled in the art will understand that the optical power delivered by the lenses 32 and 34 can be incorporated in the mirror surfaces such as mirrors 24 and 26. This greatly reduces the cost and complexity of the design. Other optical modifications using additional lenses and mirrors also may be incorporated in the design.

In accordance with another aspect of the modular scanning system, a resonant scanning means is provided for efficiently scanning the beam from the handheld unit to produce a locus of scan lines defining an enlarged scan volume for scanning items moving along a predetermined item path.

A first end of cantilever beam 35 is rigidly attached to the mirror 24. A second end of cantilever beam 35 attaches to a base 37 which is firmly held in a part of the housing. A coil 36 is disposed in proximity to the base 37 of cantilever beam 35. Leads, not shown, are provided for applying an alternating current to the coil 36 in accordance with well known techniques. The coil 36 is attracted and repelled by a permanent magnet 38 depending on the direction of current flowing through the coil 36. One skilled in the mature art of magnetics will be able to devise other efficient means of exciting the mechanical system.

In accordance with one aspect of the invention, the mirror 24 and cantilever beam 35 are a resonant mechanical system. That is, a small amount of alternating current at the resonant frequency of the system applied through the coil 36 is adequate to produce the required deflections of the cantilever beam. The deflections of resonant cantilever beam 35 are chosen so a to direct the laser beam 33 into a locus of lines defining an ideal scanning region. The mirror 24 cooperates with the pattern mirrors 26 to convert the beam 33 into three or more scan lines, two of which can be nearly vertical. As set forth above, this scan pattern enables bar code labels to be read without the need for orientation of the item.

Since the mirror 24 and cantilever beam 35 are a resonant mechanical system, only a small amount of current at the resonant frequency of this system is required to produce the required deflections and thus the scanning of beam 33.

The apparatus according to the present invention provides a modular scanning system which employs a single handheld laser unit for both handheld and fixed scanning applications. In a first module, a handheld scanner is provided for scanning items from any direction at a point of sale. In a second configuration, the same handheld scanner unit is simply and efficiently converted to a fixed scanner. The second module supplements and reconfigures the scanner line of the first module for efficient scanning with a fixed flow of goods. The modular scanner in a fixed application includes means for scanning the beam in a locus of lines which define an ideal scanning region for resolving the bar code labels of items moving on a predetermined item path. The present scanner in the fixed mode also includes improved optical means for focusing the beam waist at an optimal location for resolving bar code labels of items as they move along the item path.

Accordingly, the present modular scanning system provides the advantages of both a handheld and fixed scanner at a cost only slightly greater than the cost of the handheld scanner. The present device is very efficient and inexpensive to manufacture due to the small number of parts required. The present modular system enables a handheld scanner to also function as a fixed scanner for scanning a predetermined flow of goods along an item path without any loss of resolution or scanning efficiency. Also, the present invention enables the same scanner unit to be instantly removed from its fixed position and to function as a handheld scanner to facilitate the reading of a bar code label of items positioned in any orientation at a point of sale location or to scan oversize items which can not move along a predetermined item path. The modular handheld or fixed scanner in accordance with present invention has extreme flexibility in comparison with conventional bar code scanners and is adaptable to a wide variety of applications.

While the invention has been described in connection with what is presently considered to be the most practical and preferred embodiments, it is to be understood that the invention is not limited to the disclosed embodiment, but on the contrary, is intended to cover various modifications and equivalent arrangements included within the spirit and scope of the appended claims. For example, multiple resonant cantilever beams and mirror systems could be employed for scanning the laser beam of the modular scanning unit into multiple scanning planes, some being at right angles to others, in order to read any bar code label moved through the scanning region above the window. However, in such a structure the device still provides a modular scanner for application in either a hand held or fixed mode. Therefore, persons of ordinary skill in this field are to understand that all such equivalent structures are to be included within the scope of the following claims.

What is claimed is:

1. A fixed bar code scanner for scanning items along an item path comprising:
   a handheld scanner means for producing a beam of focused laser light and including first means for scanning said focused beam;
   detection means disposed in said handheld scanner means for collecting the scattered and/or reflected light from a bar code label including means for decoding bar code information;
   holding means for holding said handheld scanner in a predetermined position with respect to said item path;
   optical means disposed in fixed relation to said holding means for reforming said beam of laser light from said handheld scanner for optimally resolving, from a fixed position, a bar code label of items in the item path;
   second scanning means for scanning said beam of laser light from the handheld scanner in a locus of lines defining a scanning volume for resolving bar code labels of items on said item path.

2. An apparatus according to claim 1 wherein said handheld scanner is removable from said holding means to enable hand held scanning of items.

3. An apparatus according to claim 1 wherein said optical means includes a low power telescope positioned for making said laser beam smaller or larger as needed when said handheld scanner is held in said holding means to produce a beam waist at a desired location for resolving a bar code label on said item path.

4. An apparatus according to claim 1 wherein the first scanning means for scanning said focused beam in a locus of lines for handheld scanning is automatically deactivated when said handheld scanner is placed in said holding means.

5. An apparatus according to claim 1 wherein said second scanning means includes a single axis dithering mirror provided in combination with said holding means for scanning said focused beam to a scanning region on said item path.

6. An apparatus according to claim 2 wherein said second scanning means is activated by insertion of the handheld scanner in the holding means.

7. An apparatus according to claim 5 wherein said single axis dithering mirror includes a resonant dithering mirror provided in relation to said holding means for scanning said focused beam to a scanning region on said item path.

8. An apparatus according to claim 1 wherein a rotating mirror is provided relative to said holding means for scanning said focused beam in a scanning region at said item path.

9. A point of sale bar code scanner for scanning a bar code label of an item in a predetermined item path without the need for careful orientation of the item by the user characterized by:
   a base defining an item path;
   a holding means disposed in a fixed relation with respect to said base for conformably receiving and holding a hand held laser scanner for scanning items on said item path wherein said handheld scanner comprises a laser source for producing a focused beam and a means for detecting light scattered and/or reflected from said bar code label and means for producing a decoding signal representative of information contained in said label;

a scanning means fixed relative to said holding means for scanning said focused beam of said handheld laser to a predetermined locus of lines in said item path for defining an ideal scanning region.

10. An apparatus according to claim 9 wherein said handheld scanner is removable from said holding means and includes means for scanning said focused beam in a locus of points defining a scan line for resolving a bar code label from a handheld position.

11. An apparatus according to claim 9 wherein said handheld scanner is positioned in said holding means and a mirror means is disposed downstream along the path of said focused beam for scanning said focused beam of said handheld scanner to a predetermined locus of lines on said item path.

12. An apparatus according to claim 9 further including optical means for reforming said focused beam for optimally resolving a bar code label of items on said item path from a fixed position when said handheld scanner is held in said holding means.

13. An apparatus according to claim 9 wherein said means for scanning comprises a single axis dithering mirror disposed in a fixed relation to said holding mean for scanning said focused beam of said handheld scanner in a locus of points forming a scanning volume along said item path.

14. An apparatus according to claim 9 wherein said means for scanning comprises a resonant dithering mirror oscillating at a resonant frequency for scanning said focused beam in a locus of lines for defining a scanning region at said item path.

15. An apparatus according to claim 9 wherein said means for scanning comprises a rotating mirror disposed in a fixed relation with said holding means and downstream of said beam path of said handheld scanner for scanning said focused beam in a predetermined locus of lines defining a scanning region at said item path.

16. A modular bar code scanner capable of use in both free and fixed scanning applications comprising:
a first module including a handheld scanner for scanning a bar code of an item from any direction, said handheld scanner including:
means for producing a focused beam of laser light;
scanning means for scanning said focused beam in predetermined scan lines for resolving a bar code label;
detecting means for collecting light reflected from said bar code label including decoding means for producing a signal representative of item information;
a second module including a surface for defining an item path;
a holding means fixedly disposed in a base relative to said item path for conformably receiving and holding said handheld scanner such that said focused beam defines a beam path;
mirror deflection means disposed downstream in said beam path for deflecting said focused beam in additional directions for defining a scanning volume at said item path for resolving a bar code label.

17. An apparatus according to claim 16 wherein said second module further includes a resonant scanning means, oscillating at a resonant frequency for scanning said focused beam in a predetermined locus of points defining a scanning region on said item path.

18. An apparatus according to claim 17 wherein said resonant scanning means comprises:
a resonant cantilever beam having a first end fixedly attached to a mirror means disposed downstream in said beam path for deflecting said focused beam and said resonant cantilever beam having its second end fixedly disposed in a base;
a coil means disposed on the back side of said mirror means having a means for receiving an applied AC current;
magnet means disposed in a proximity of said coil means and at a predetermined distance such that a small amount of current at the resonant frequency of said cantilever beam applied to said coil means produces the required deflections of said mirror for scanning said focused beam in a predetermined locus points.

19. An apparatus according to claim 18 wherein said modular bar code scanner further includes:
pattern mirror means disposed downstream in said beam path from said resonant scanning means for further scanning said focused beam in a substantially omnidirectional pattern for resolving bar code labels of items on said item path.

20. An apparatus for scanning items both by hand and from a fixed position relative to an item path comprising:
a handheld scanner including a source of laser light;
means for focusing said laser light to provide a scanning beam;
first scanning means for scanning said beam of focused light in a predetermined locus of points defining a scan line for resolving a bar code label from a handheld position;
collector means for detecting light reflected from said bar code label including decoder means responsive to said collective light for producing a signal representative of item information;
a surface for defining an item path;
holding mean fixed relative to said item path for receiving and fixedly holding said handheld scanner in a predetermined position for scanning items on said item path;
mirror means for deflecting said scanning beam from said handheld scanner in a predetermined locus of points defining a scanning region for resolving a bar code label of an item on said item path.

21. An apparatus according to claim 20 wherein said first scanning means is deactivated when said handheld scanner is positioned in said holding means and wherein a second scanning means is provided downstream in said beam path for scanning said beam in a predetermined pattern for producing an ideal scanning region at said item path.

22. An apparatus according to claim 21 wherein said second scanning means is a dithering mirror having a single axis.

23. An apparatus according to claim 21 wherein said second scanning means comprises a resonant dithering mirror for deflecting said focused beam in accordance with a predetermined frequency to define a scanning plane at said item path.

24. An apparatus according to claim 21 wherein said second scanning means comprises a rotary mirror for scanning said focused beam in a substantially omnidirectional pattern for resolving a bar code label of an item on said item path.

* * * * *